Nov. 15, 1938.　　　　R. S. BEGG　　　　2,136,835
HYDRAULIC BRAKE SYSTEM
Filed March 21, 1935　　　3 Sheets-Sheet 1
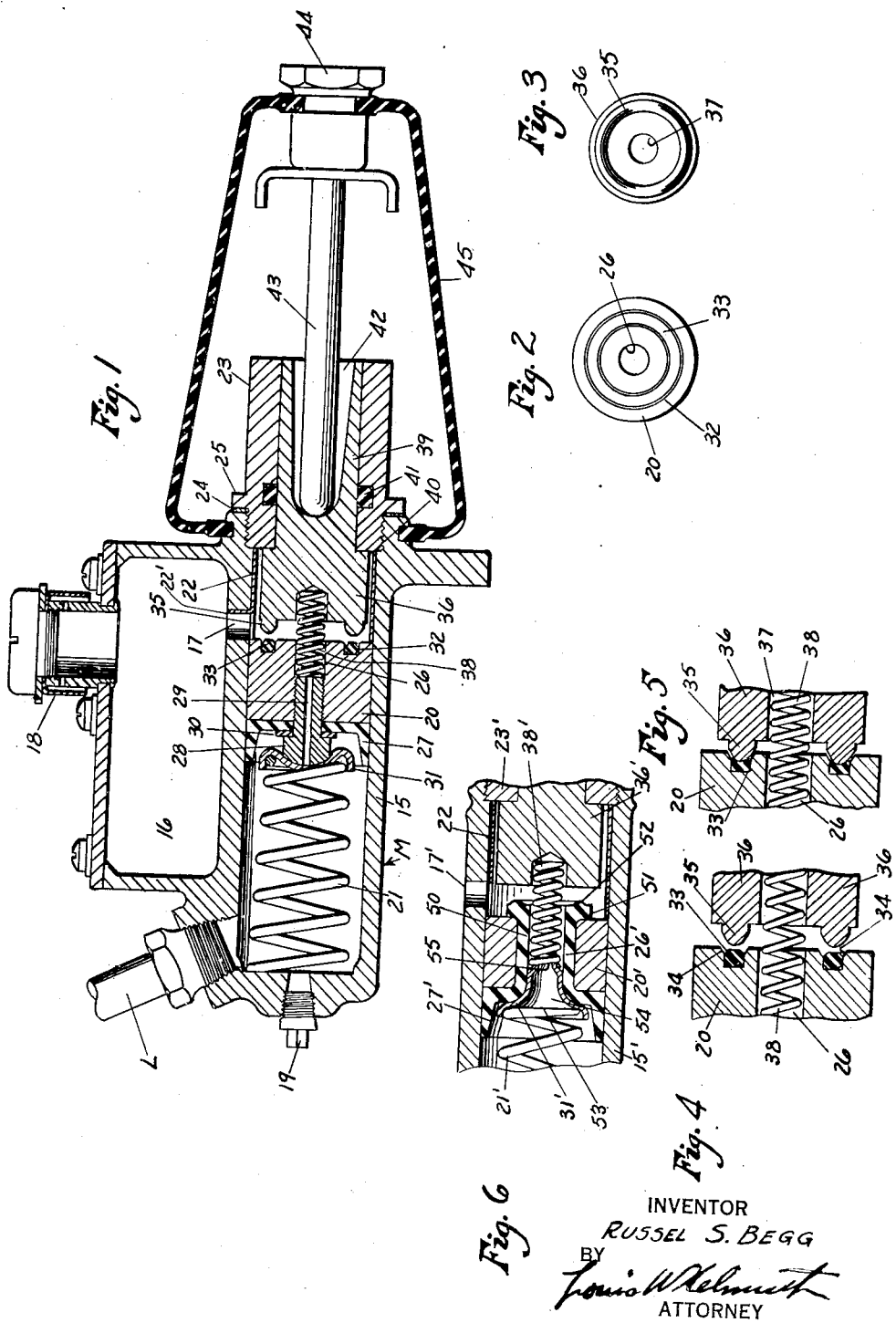
INVENTOR
RUSSEL S. BEGG
BY
ATTORNEY

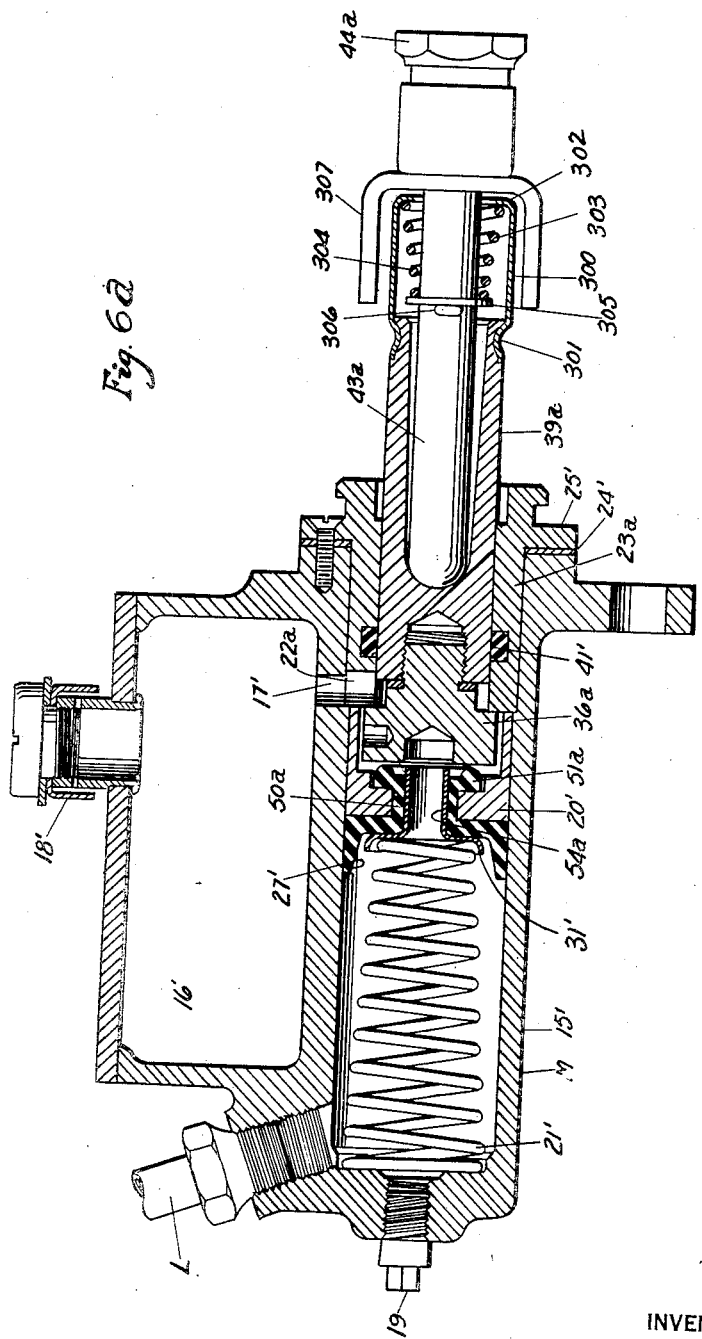

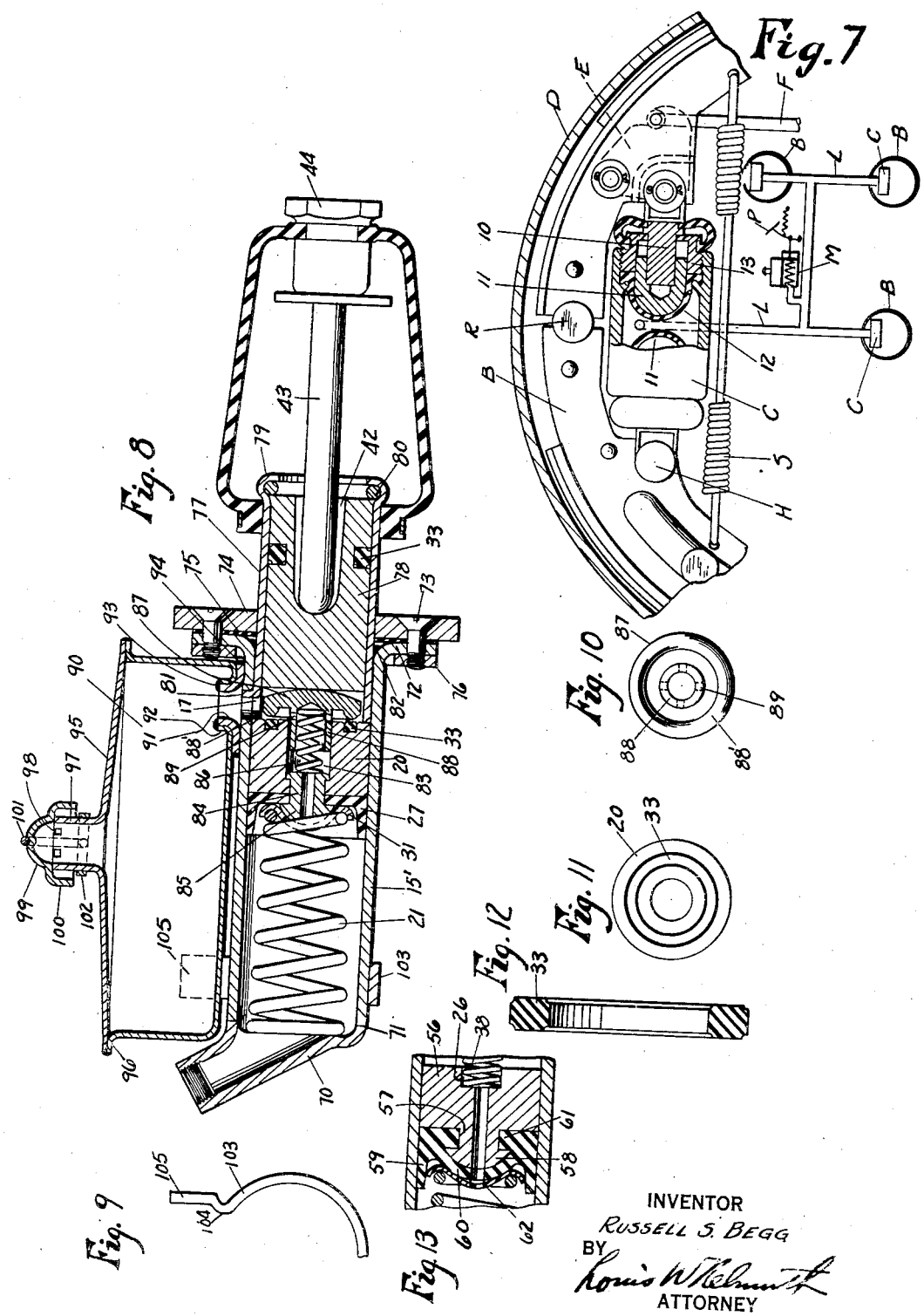

Patented Nov. 15, 1938

2,136,835

UNITED STATES PATENT OFFICE 2,136,835

HYDRAULIC BRAKE SYSTEM

Russell S. Begg, Cleveland Heights, Ohio, assignor to The Midland Steel Products Company, Cleveland, Ohio, a corporation of Ohio Application March 21, 1935, Serial No. 12,123

6 Claims. (Cl. 60—54.6)

This invention relates to new and useful improvements in force transmitting systems and more particularly to hydraulic brake mechanism.

An important object of the invention is to provide improved pressure creating devices more commonly known to the hydraulic brake art as master cylinders for exerting pressure on a column of liquid to transmit this pressure to the brake operating mechanism at each vehicle wheel.

Equally important functions of this master cylinder are those of filling any voids or partial vacuum spaces with liquid ahead of the piston of the master cylinder at any point during its retractile movement due to the piston returning faster than the column of liquid from the brake lines; to compensate for any losses of the liquid in the system due to leaks, and to permit the expansion and contraction of the liquid in the system due to varying temperature changes whereby the proper amount of liquid will be provided in the system at all times.

Another object of the invention is to provide a single port or passage connection from the reservoir to the master cylinder which will compensate for loss of liquid, and expansion and contraction thereof in the system.

A further object of the invention is to provide for the master cylinder, a positively actuated valve of special construction for controlling the passage of liquid through the piston in carrying out the foregoing objects.

A still further object of the invention is to provide a master cylinder and reservoir constructed of sheet metal parts to reduce the cost and facilitate greater rapidity in the manufacture thereof.

Other objects and advantages of the invention will appear during the course of the following description.

In the accompanying drawings forming a part thereof and wherein like numerals are employed to designate like parts throughout the several views, Fig. 1 is a longitudinal vertical section of one form of the improved master cylinder, Fig. 2 is an end elevation of the piston, Fig. 3 is an end elevation of the valve head, Fig. 4 is an enlarged fragmentary longitudinal section of the positively actuated valve employed in the master cylinder showing it in open position, Fig. 5 is a similar view showing the valve closed, Fig. 6 is a longitudinal section of another form of the valve, Fig. 6a is a similar section of a further form of master cylinder, Fig. 7 is a diagrammatic view of the hydraulic brake system as applied to four wheel vehicle brakes, one of the brake mechanisms being shown on an enlarged scale partly in section to clarify the illustration, Fig. 8 is a longitudinal vertical section of a modified form of master cylinder and valve construction, Fig. 9 is an end elevation of the forward end thereof, Fig. 10 is an end elevation of the piston of this modification, Fig. 11 is an end elevation of a modified form of valve, Fig. 12 is a section of the gasket or packing employed in the valve seat, Fig. 13 is an enlarged section of a modified form of piston and means of attaching the packing cup thereto.

Referring now more specifically to these drawings and more particularly to Fig. 7 wherein is shown a diagrammatic illustration of the hydraulic brake system for four wheel motor vehicle brakes, M indicates a master cylinder or pressure creating device which is operated in the usual manner by the usual foot pedal P. Liquid from the master cylinder, upon depression of the foot brake pedal, is forced through the pipe lines L to the four wheel cylinders C, one of which is shown in this figure on an enlarged scale to show the interior construction thereof and its association with a friction device or brake band D. The manner of mounting this wheel cylinder C on the brake band D and the details of construction of the brake applying mechanism is more fully described in my co-pending application Serial No. 680,722 wherein is described mechanical linkage for applying the brake on the two rear wheels cooperating with the wheel cylinders for expanding the friction device into braking contact with the drum D. This mechanical linkage includes a bell crank lever E, pivotally mounted on one end of the friction device and moved on its pivot by a cable or rod F. One of the piston stems 10 separate from the piston head 11 which cooperates with its respective diaphragm 12, abuts the bell crank lever E, so that when the latter is swung on its pivot a shoulder on the piston stem will abut a stop of guide 13 on the wheel cylinder to move the latter and consequently the other end of a self energizing band D, which is connected as at H with the other piston of the cylinder. This will move the ends of band D against the drum and against the action of a spring S which connects opposite ends of the brake band and normally holds the two ends of the band against the anchor pin R. The piston heads 11 of the wheel cylinders are identical and are preferably made of brass or a metal possessing an amount of free graphite so as not to damage the rubber diaphragms 12. These cup shaped diaphragms are clamped at their edges between integral annular ribs on the wheel cylinder and shoulders of the cap guides 13 which are screw threaded into the ends of the cylinder and form bearings in which the piston heads 11 slide. The outer flanged end of each sleeve forms an abutment to limit the outward movement of the piston heads so that when a friction device is removed for relining, the pistons 11 will not be displaced from the wheel cylinders. The anchor pin R of course limits the stretching of the diaphragm 12 under the influence of the retractor spring S, as will be well understood. From the foregoing, it will be apparent that the retractor spring moves the two pistons in each wheel cylinder toward each other thereby tending to move the body of liquid confined therebetween through the pipes and back into the master cylinder M when pressure on the foot pedal is relieved.

Referring now to Fig. 1 of the drawings, the numeral 15 designates a master cylinder cast integral with a liquid reservoir 16, and which are at all times in communication by a single port 17. A combined breathing and filling cap or plug 18 is provided in the top of the reservoir. The forward end of the cylinder 15 is provided with a pair of threaded openings, one of which may be occupied by a pipe line fitting L for transmitting liquid to the four brake mechanisms, and the other by a bleeding and filling plug 19.

Reciprocably mounted in the cylinder 15 is a floating piston 20, normally urged to a retracted position by a coil spring 21 back against the forward end of a sleeve 22 suitably mounted in the rear end of the cylinder. Fig. 1 shows the normal brake release position of the piston when the foot pedal is fully retracted and sleeve 22 insures against the piston 20 retracting so far as to cover the port 17 through which liquid is furnished to the cylinder from the reservoir 16 in all positions of the piston. This arrangement assures that the pistons will always be located ahead of the port 17. The outer end of stop sleeve 22 abuts against the end of a valve guide sleeve 23 which is screwed into the master cylinder to compress a gasket 24 between the end of the cylinder and an annular shoulder 25 formed integrally with the guide. The sleeve 22 is of course prevented from relative rotation within by a tang 22' in order to maintain an opening in the sleeve in registration with the port 17.

The piston 20 is provided with a longitudinal central axial passage 26 extending through its front and rear faces whereby the chambers forwardly and rearwardly of the piston are normally in communication and with the reservoir 16 through port 17 so that any deficiency in liquid ahead of the piston can be made up from liquid passing from the reservoir and any excess liquid in the lines and chamber ahead of the master piston drawn in on the retractile stroke of the piston may be relieved into the reservoir. Expansion and contraction of the liquid under varying temperature conditions is also taken care of by reason of this normally open porting.

A skirted or cup-shaped rubber washer is provided with a central opening and associated with the forward face of piston 20 so that the skirt thereof engages the walls of the cylinder and prevents leakage past the piston during the forward stroke of the piston. A screw 28 having a longitudinal passage 29 therethrough is threaded into the piston and the head of the screw clamps a washer 30 against the central portion of the rubber cup 27 to bind it into sealing engagement with the piston. A spring seat 31 having a central opening therein fits over the head of the screw 28 and forms a seat for one end of the spring 21, the other end thereof engaging the forward wall of the master cylinder as illustrated for normally moving the piston back against the forward end of sleeve 22.

The rear face of piston 20 is provided with an annular groove 32, concentric with the central passage 26 for receiving a rubber annular gasket or ring 33 of the cross section more clearly illustrated in Fig. 12. This ring 33 is of the shape illustrated to permit its compressibility into its groove as shown in Fig. 5. The two outer edges 34 of this groove are chamfered as illustrated best in Fig. 4 to form a metal to metal contact with a suitably shaped annular rib 35 projecting forwardly from the forward face of a valve body 36 after the gasket 33 has been compressed thereby. This insures a fluid tight seal and cuts off communication between the chambers in front of and in rear of the piston 20 during a brake application caused by forward movement of the piston and valve head 36. This valve head is provided with a central cavity 37 which pilots one end of an expansion coil spring 38 which is weaker than spring 21 to cause immediate separation of the valve head 36 from the piston 20 when pressure on the head is realized to permit communication between the forward and rear chambers in the cylinder on opposite sides of the piston. The forward end of this coil spring 38 fits in the passage 26 of the piston and bears against the inner end of screw 28 as illustrated.

The valve head 36 has a reduced stem portion 39 thereby providing a shoulder 40 which engages the inner end of valve guide 23 and limits the retractile movement of the valve head. A rubber packing ring 41 similar to the ring 33 is positioned in a groove in the sleeve 23 to pack the piston stem 39 and prevent leakage of fluid past the stem. This stem 39 is provided with an axial tapered cavity 42 in which a rod 43 having a rounded end bears for moving the valve head 36 forwardly upon depression of the foot pedal, connected through linkage to the coupling member 44. A rubber boot 45 surrounds and encloses the rod 43 and sleeve 23 to exclude extraneous matter from the moving parts.

The operation of the device thus far disclosed is as follows: The entire system is filled with the hydraulic brake solution and is purged of all air in the usual manner. This brake fluid of course fills the reservoir 16 and the chambers ahead of and behind the piston 20. Reference to Fig. 1 will show the parts in their normal position when the brakes are released, illustrating that expansion of fluid ahead of the piston can be relieved by its passage through the piston to the chamber to the rear thereof and through the port 17 into the reservoir 16. Likewise, any deficiency of liquid ahead of the piston will find its way through the port 17, piston 20 and into the chamber ahead of the piston. Consequently, a single port 17 takes care of expansion and contraction of the liquid as well as any surplus or deficiency ahead of the piston due to varying temperatures or operating conditions. Because of the special construction of the wheel cylinders, no pressure in the pipe lines has to be maintained while the mechanism is in brake release position and the system will automatically possess the requisite amount of brake fluid at all times. Upon forward movement of the link 43 caused by depression of the foot pedal, the valve head 36 moves forwardly to engage the gasket 33 to compress the same and thereby shut off communication between the chambers at the front and rear of the piston 20 by closing passage 26. Simultaneously, the valve head 36 moves the piston 20 forwardly or to the left of Fig. 1 thereby causing the column of liquid ahead of it to be moved through the pipe lines to the brake mechanisms at the wheels thereby causing their pistons 11 to move outwardly and expand the friction devices into engagement with the drums of the wheels. Upon release of pressure on the foot pedal, the usual brake pedal spring immediately permits retraction of the valve head 36 and the spring 38 to lift it from its seat while the spring 21 retracts the piston 20 and permits liquid to flow from the reservoir through the piston to the forward chamber ahead of the same since the piston 20 usually moves more rapidly than the returning column of fluid. This permits more liquid to be drawn into the system from the reservoir than is normally required when the piston is in brake release position so as to compensate for any leaks in the pipe connections and any surplus in the system, when the parts have reached their normal brake release position, will find its way back through the passage in the piston and into the reservoir. If desired, the rod 43 can be connected to the valve head 36 to positively retract it.

In Fig. 6, a modified cup and gasket construction is illustrated and the parts corresponding with those in Fig. 1 are designated by the same numerals with a prime coefficient applied thereto. In this arrangement, the cup 27' not only forms a seal for the liquid in the forward chamber of the master cylinder but also provides a valve seat or gasket for seating cooperation with the valve head 36'. This is made possible by forming the rubber cup 27' with a central hollow tube 50 which extends through the passage 26' in the piston and terminates at its rear end in an outwardly extending annular flange 51 seating against the rear face of piston 20'. The outer face of this flange is provided with an annular concentric integral raised rib 52 which is adapted to engage with the forward flat face of the valve head 36', when the latter is moved forwardly. A spring seat 31' is provided with an enlarged annular cupped end 53 for reception of one end of the retractor spring 21' and has a tubular portion 54 snugly fitting within the tubular portion 50 of the rubber cup 27', to thereby retain the cup in sealing engagement with the forward face of the piston and the walls of passage 26'. The inner end of this tube 54 is reduced as at 55 and thereby provides a pilot for the end of the valve spring 38'. The operation of this modification is practically the same as that previously described.

In Fig. 6a, a modified master cylinder construction is illustrated and the parts corresponding with those in Fig. 1 are designated by the same numerals with a prime coefficient applied thereto, while parts corresponding with those shown in Fig. 6 are designated by the same numerals of Fig. 6 with the letter a applied thereto. In this form of construction, the valve head 36a is positively retracted from a brake application stroke of the piston 20' by means of the normal retraction of the foot pedal connected with connection 44a. This is accomplished by pressing one end 301 of sleeve 300 into an annular recess in the end of valve operating part 39a. The outer end of sleeve 300 is provided with an inturned flange 302 to form an abutment for the larger end 303 of a conical shaped coil spring 34, the smaller end of which abuts a washer 305 stopped against a cotter pin 306 extending diametrically through the rod 43a. This construction provides a yielding connection between rod 43a and valve operator 39a when the former is retracted by the brake pedal return movement which causes washer 305 to move the spring 304 rearwardly against shoulder 302 thereby retracting valve operator 39a. The U-shaped stamping 307 mounted on rod 43a is provided in all modifications to form a stop against the end of bushing 23a to limit the protractile movement of the valve operator 39a in making a brake application.

This valve stem guide 23a is secured to the master cylinder as illustrated and its inner end forms a stop for the retractile movement of both the valve head 36a and piston 20'. Of course the inner end of the guide sleeve 23a is provided with an opening registering with port 17' leading into the reservoir 16'.

The spring seat 31' is provided with a tubular portion 54a longer than the portion 54 shown in Fig. 6 and is of a size to enter an axial cavity in valve head 36a when the latter is moved forwardly by the pedal action during a brake application. This allows for proper compression of the annular flange 51a, excessive compression thereof being prevented by abutment of the forward face of the valve head 36a with the wall of piston 20'. In this modification, it will also be noted that the normal position of the valve head 36a is within a cavity in the rear face of the piston whereby the guide sleeve 23a will form a stop for both the piston and the valve head when in their fully retracted positions. It will also be apparent that clearance space between the valve head 36a and piston walls is provided so that liquid can freely circulate back and forth from the forward side of the piston to reservoir in all relative positions of the parts except when they are moving forwardly during a brake application.

In this modification of valve head 36a, it is formed separately from the operating stem 39a and is screwed therein with a suitable lock washer interposed therebetween to facilitate assembly and dismantling of the parts.

In Fig. 13 a further modification of the rubber sealing cup is illustrated for the forward face of the piston 56 which is like piston 20 except that its forward face is provided with a central forwardly projecting neck 67 terminating in an enlarged integral head 58, both of which have a passage communicating with the central passage 26 through the piston. A rubber sealing cup 59 is provided with a central semi-spherical forwardly projecting knob having a socket 60 to receive the enlarged head 58 of the piston and with a flange portion 61 fitting snugly around the reduced neck 57 to form a seal against the piston. This central embossed portion of the cup 59 is provided with an opening in registration with the passage through the piston and a spring seat 62 fits over this knob and has its face in engagement with the cup 59 to force that portion thereof beyond the knob into firm engagement with the forward face of the piston. This spring seat 62 is of course adapted to receive one end of the retractor spring 21. The piston in this instance is provided with a shoulder in the passage 26 to form an abutment for one end of the spring 38 which normally separates the valve head from the piston body.

In Figs. 8 and 9 a modified form of master cylinder is illustrated with a further modification of valve structure and with parts of the cylinder and reservoir constructed from stampings instead of castings. Those parts of this modification which correspond to parts of the other modified forms previously described, will be indicated with corresponding reference numerals. The master cylinder 15' in this modification is constructed from an open ended welded, seamless or drawn tube with a cap 70 welded as at 71 to the forward end of the cylinder. This end of the tube can be made integral with a drawn tube and provided with perforations to receive the pipe line fitting and filling plug. The opposite end of the cylinder is flanged outwardly as at 72 and provided with a series of circumferentially spaced openings to receive screws 73 for fastening an attaching and mounting plate 74 to the flange 72 with a gasket 75 clamped therebetween. The threaded ends of screws 73 pass through threaded apertures in a ring 76 positioned on the flange 72 on the opposite side from the mounting plate 74. A sleeve 77 has one end extending through the mounting plate and into the inner end of the master cylinder 15' to form a guide for a valve actuator 78 which corresponds to the stem of the valve head in Fig. 1. This actuator is provided with a groove to receive a rubber packing ring 33 therein which slidably engages the inner wall of guide sleeve 77. The rear end of the guide sleeve 77 is pressed with a groove and flange 79 to receive a snap ring 80 to form an abutment to limit the retractile movement of the valve actuator 78. The forward end of the guide sleeve is provided with an aperture in registration with port 17 and a tang 81 may be bent up into the opening to prevent accidental rotation of the guide sleeve. Where the guide sleeve 77 enters the master cylinder, a circumferential weld 82 may be laid in the joint to fix these two members together in which event the tang 81 can be eliminated.

The piston 20 has its retractile movement limited by its abutment with the forward end of guide sleeve 77 and is provided with an axial passage 83 thru its front and rear faces as in the other modifications. The rubber cup 27 is affixed to the forward face of the piston by a tubular fastening 84 having an integral head 85 for retaining the cup washer 27 in position on the front face of the piston. The inner end of the tube 84 is riveted over or upset against a shoulder in the passage of the piston and thereby forms an abutment for a valve operating spring 86.

A valve head 87 is provided with a rearwardly convexed rear face and on its forward face is provided with a seating annular rib 88 which is adapted to engage the rubber ring 33 of the piston in the manner described in preceding modifications. This valve head is provided with a tubular forward extension forming a pilot slidably mounted in the passage of piston 20 and is provided with apertures 89 for communicating the passage through the piston with the chamber in rear thereof when the valve head assumes its normal position as illustrated in Fig. 8 which apertures are closed by the walls of passage of the piston when the valve head is pressed on its seat by the actuator 78. The valve spring 86 enters the pilot tube 88 and bears against the valve for normally separating it from the piston 20 during the retractile stroke of the piston and actuator 78. The operation of this master cylinder is the same as in the preceding forms.

The reservoir 90 for this modification is made of sheet metal, and pressed or drawn to shape with its bottom provided with an inturned flanged opening 91 to receive therein a flanged collar 92 welded to or formed integral with the cylinder 15'. When this collar 92 is formed integral with the cylinder it provides the port 17. The nipple 91 and flanged collar 92 may be welded together as at 93. When the collar 92 is formed separate from the cylinder 15' it may be welded around its margin to the master cylinder and also to the bottom of the stamped reservoir as at 94.

A stamped cover 95 of the reservoir may be secured in any suitable manner to an outwardly extending marginal flange 96 and is provided with a pressed up neck 97 with suitable venting apertures or notches 98 provided therein. A stamped cap 99 in the form of a dome having a stepped depending flange or skirt 100 fits on top of the neck 97 and is removably retained in position by a swinging bail 101 pivotally attached at its two ends to a ring 102 fastened to the neck 97.

The forward end of the reservoir is supported on the forward end of cylinder 15' by a band encircling the cylinder and folded back upon itself as at 104 to form a seat for the reservoir. The two upper free ends of this band or strap are designated by the numeral 105 and are welded to the two opposite sides of the reservoir in any suitable manner. The band 103 may also be welded to the cylinder 15' at suitable points.

It is to be understood that various changes in the size, shape and arrangement of parts may be resorted to without departing from the spirit of the invention or the scope of the appended claims.

I claim:

1. A master pressure cylinder, a piston reciprocable therein and having a normally open fluid passage extending axially through its forward and rear faces, a cup packing for the forward face of the piston having a skirt engaging the cylinder wall and a tubular extension extending through said passage and terminating in a flange engaging the rear face of the piston to form a valve seat, a valve head by which the piston is moved forwardly and which engages said valve seat to close said passage through the piston during its forward movement, and reservoir means connected to deliver liquid at all times to the cylinder behind the piston.

2. A master fluid pressure cylinder, a piston reciprocable therein having a normally open fluid passage extending through its forward and rear faces, a valve head adapted to close said passage, means normally separating said piston and valve head to maintain the passage open, a bearing sleeve having one end extending into said cylinder and forming a stop to limit the retractile movement of said piston, and a valve actuating member slidably mounted in said sleeve for operating said valve head.

3. A master fluid pressure cylinder, a reservoir, a floating piston in the cylinder having a normally open passage extending through its forward and rear faces and a cavity concentric with said passage, said cylinder having a port communicating with the reservoir at all times in rear of the piston, a valve head movable in said cavity and normally spaced from the walls thereof, said valve head being movable forwardly to close said passage and move said piston forwardly, means for positively retracting the valve head and separating it from said walls of the cavity to open said passage during the retractile movement of said piston, and common means for limiting retractile movement of said valve head and piston to space said valve head from the walls of said cavity for opening said passage.

4. A master pressure cylinder, a piston reciprocable therein and having a normally open fluid passage extending axially through its forward and rear faces, a spring urging said piston to retracted position, a cup packing for the forward face of the piston having a skirt engaging the cylinder wall and a tubular extension extending through said passage and terminating in a flange engaging the rear face of the piston to form a valve seat, a metallic tube extending through said tubular extension and having a seat formed on one end for said spring, a valve head by which the piston is moved forwardly and engages said valve seat to close said passage through the piston during its forward movement, and reservoir means connected to deliver liquid at all times to the cylinder behind the piston.

5. A master pressure cylinder, a piston reciprocable therein and having a normally open fluid passage extending axially through its forward and rear faces, said piston having a chamber, a cup packing for the forward face of the piston having a skirt engaging the cylinder wall and a tubular extension extending through said passage and terminating in a flange engaging the rear face of the piston to form a valve seat, a valve head operating with clearance in said piston chamber and by which the piston is moved forwardly and which engages said valve seat to close said passage through the piston during its forward movement, and reservoir means connected to deliver liquid at all times to the cylinder behind the piston.

6. A master pressure cylinder, a sleeve in the rear end thereof constituting a stop shoulder, an annular packing ring in said sleeve, a valve stem slidably engaged with said sleeve and packing and having a longitudinal socket in its outer end, an actuator stem mounted in said socket and having a collar fixed thereon with a spring between said collar and end of said socket and adapted to be compressed upon retractile movement of the actuator, a piston reciprocable in said cylinder and having a fluid passage, said piston being adapted to engage said stop shoulder upon reaching its fully retracted position, and a valve head connected to said valve stem and adapted to close said passage in the piston during forward movement of said head.

RUSSELL S. BEGG.